United States Patent [19]

Thrasher, Jr. et al.

[11] 4,324,316
[45] Apr. 13, 1982

[54] INJECTION LUBRICATOR CONTROLLED BY COUNTING MECHANISM

[75] Inventors: George E. Thrasher, Jr., Pontiac; David Lombardi, Sterling Heights, both of Mich.

[73] Assignee: Master Pneumatic-Detroit, Inc., Sterling Heights, Mich.

[21] Appl. No.: 115,680

[22] Filed: Jan. 28, 1980

[51] Int. Cl.³ .............................................. F16N 13/16
[52] U.S. Cl. ..................................... 184/29; 184/7 D; 184/55 A; 184/56 A
[58] Field of Search .............. 184/29, 39, 55 A, 56 A, 184/7 D, 7 E, 7 F, 6.28, 1 C

[56] References Cited

U.S. PATENT DOCUMENTS

| | | | |
|---|---|---|---|
| 2,063,352 | 12/1936 | Stewart | 184/29 |
| 3,731,763 | 5/1973 | Thrasher et al. | 184/55 A X |
| 3,926,279 | 12/1975 | Thrasher et al. | 184/7 D X |
| 4,105,095 | 8/1978 | Thrasher | 184/55 A |
| 4,125,176 | 11/1978 | Thrasher | 184/29 X |

Primary Examiner—David H. Brown
Attorney, Agent, or Firm—Barnes, Kisselle, Raisch & Choate

[57] ABSTRACT

In a lubricator which employs an injection pump connected with an air line to a tool by a branch air line through which pulses of air under pressure are transmitted to the pump for operating the same, a pulse counting mechanism interposed in the branch air line and including a first valve which opens the branch air line for operating the pump after each series of pulses of a predetermined number. The first valve carries a check valve operable to relieve the pressure of air trapped in the pump incidental to closing of the branch air line.

30 Claims, 12 Drawing Figures

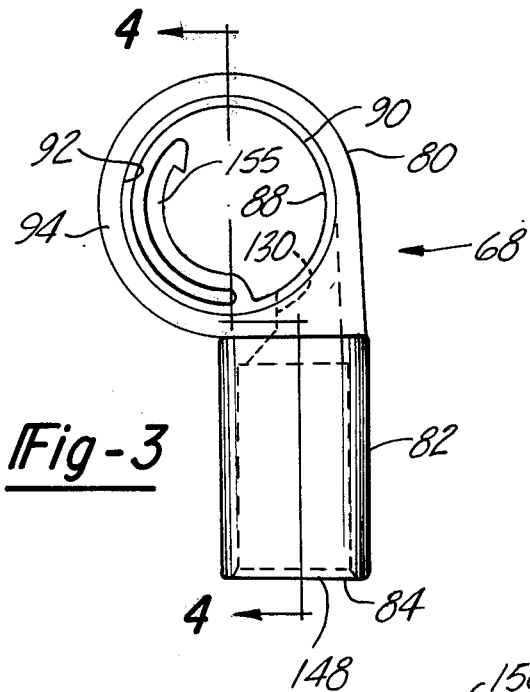
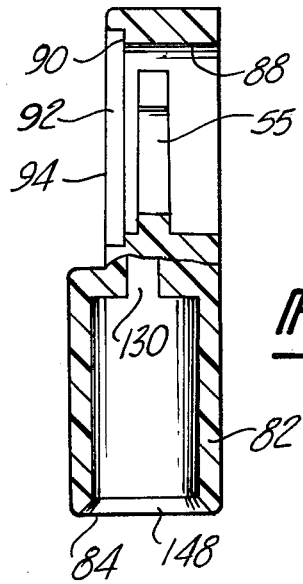
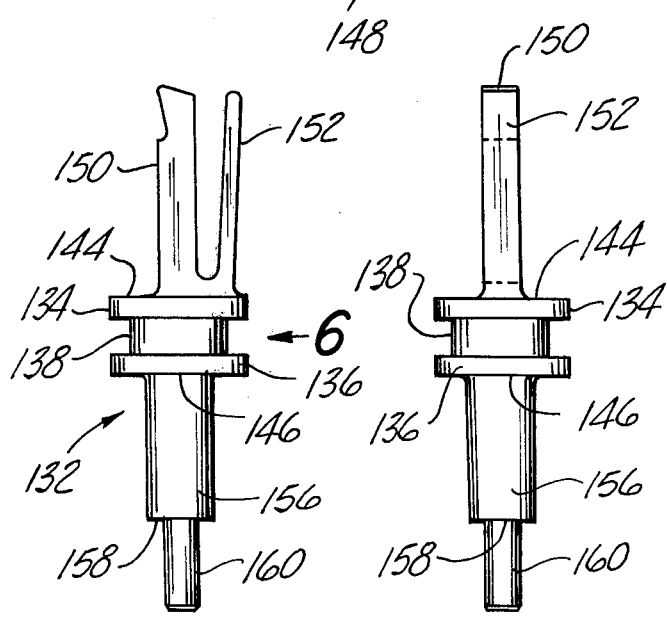
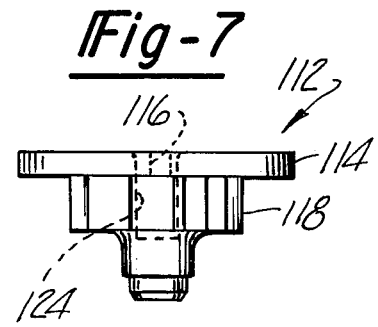
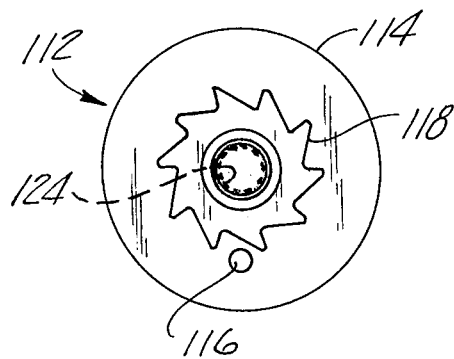

INJECTION LUBRICATOR CONTROLLED BY COUNTING MECHANISM

This invention relates generally to lubricators of the type disclosed in U.S. Pat. Nos. 3,731,763 and 3,926,279. In such lubricators, lubricant is furnished to a pneumatically operated tool or the like by means of an injection type pump. A sensing device or responder is mounted in the air line through which compressed air is furnished to the tool. This device causes the lubricator pump to provide positive delivery of a predetermined quantity of lubricant to the intended equipment upon each starting of a flow of air thereto.

Lubricators of this type have found wide acceptance commercially and have functioned very satisfactorily under myriad environmental and operating conditions. Nevertheless, they have a notable disadvantage in that they are suitable for use only with relatively large tools such as are typically employed in the automobile manufacturing industry. In general, they have not been suitable for use in connection with relatively small tools such as are typically employed in the appliance manufacturing industry. Such relatively small tools require a maximum lubricant delivery rate of about 1/20 to about 1/40th of one drop per cycle of operation, a drop being defined as 1/30 cc.

One possible way to achieve such small delivery rates would be to use a pump plunger of very small diameter. However, about 8 to 10 drops of lubricant are required to prime a typical lubricator pump and this would require that the small pump plunger be cycled manually 100 to 200 times in the priming process which is unacceptable in practice. The conventional lubricant pump has a mechanism by which the at rest position of the plunger can be adjusted to adjust the length of stroke of the plunger for varying the delivery rate of the pump. Theoretically, it might be possible to utilize a pump plunger of ordinary dimensions, e.g., 0.125 inch, and modify the adjusting mechanism to provide very fine adjustments. In practice, however, this would not work satisfactorily because normal manufacturing tolerances in the pump structure can accumulate to exceed the incremental lengths of stroke of the plunger required for very fine adjustment of the delivery rate. This problem might be overcome by calibrating each individual pump and providing individual instructions for the adjustment of each pump. However, this would add objectionably to the cost of each pump, and on the basis of past experience, we can assert with confidence that the added inconvenience would be unacceptable to the user.

Another alternative would be to use a conventional pump in conjunction with a counting mechanism such as that shown in U.S. Pat. No. 3,421,600 to actuate the pump only once for each time the tool to be lubricated cycles a predetermined number of times. However, as a practical matter, it would be cost-prohibitive to use that counting mechanism in conjunction with a single lubricator.

The object of the present invention is to provide a relatively simple inexpensive lubricator structure of the type discussed above, improved to deliver lubricant reliably at very small adjustable predetermined rates.

In the accompanying drawings:

FIG. 3 is a plan view on a scale between that of FIGS. 1 and 2 of a cartridge for containing a valve member and its actuator.

FIG. 4 is a sectional view on line 4—4 of FIG. 3.

FIG. 5 is a plan view of a piston and pawl structure for actuating the member valve.

FIG. 6 is a view taken in the direction of arrow 6 of FIG. 5.

FIG. 7 is an elevational view of the valve member.

FIG. 8 is a bottom plan view of the valve member.

Figure 1:
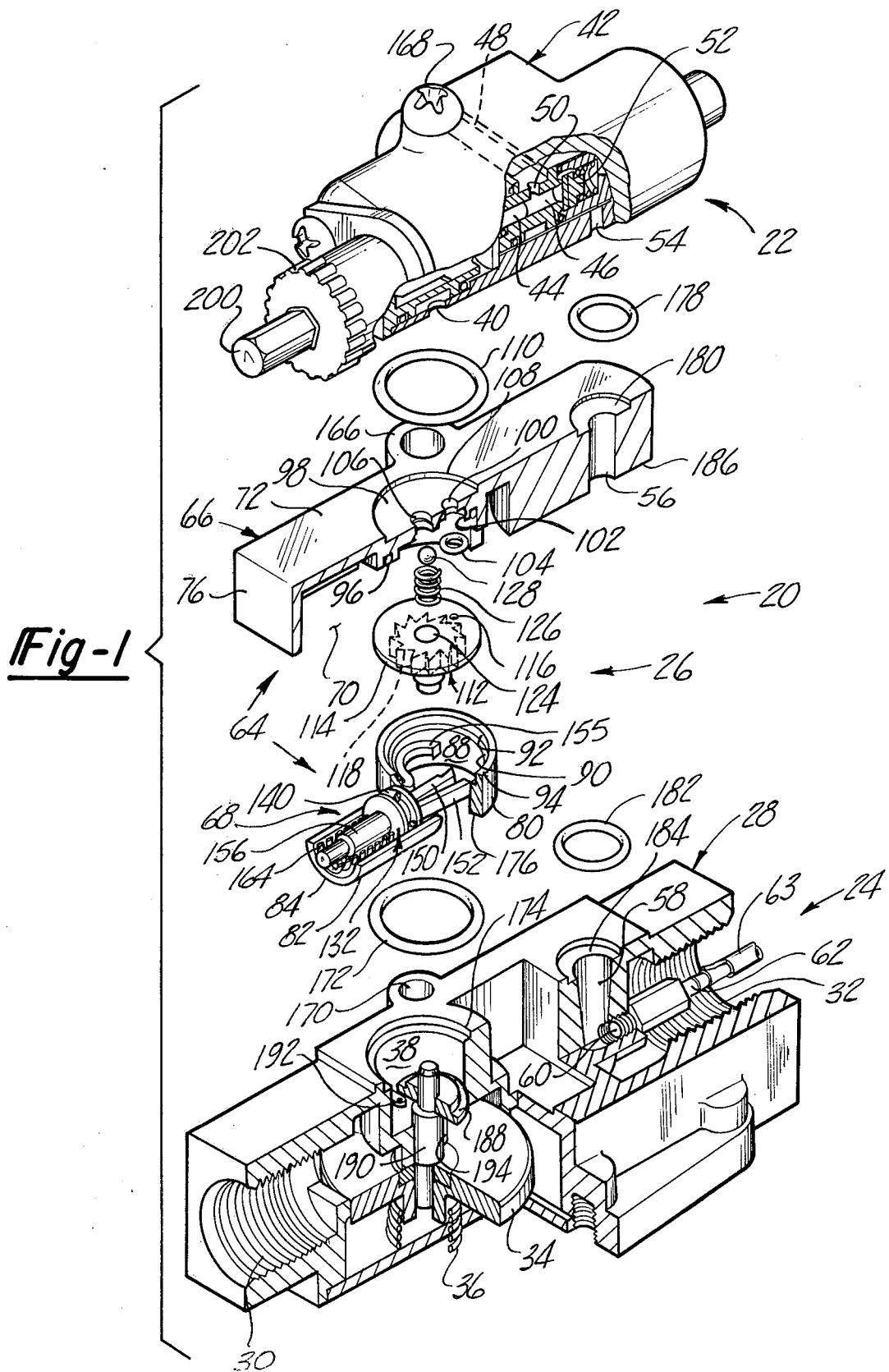
FIG. 1 is an exploded perspective view of a lubricator according to the present invention.

Shown in the drawings is a lubricator 20 according to the invention. The lubricator includes an injection-type lubricant pump 22 which is actuated intermittently by a sensing device or responder 24 in cooperation with a counting mechanism 26. Sensor 24 has a body 28 provided with an inlet 30 and an outlet 32 threaded for connection respectively with upstream and downstream portions of a main air line (not shown) through which air under pressure is furnished to pneumatically operated equipment such as an air cylinder or tool. When the equipment is placed in operation, a flow of air is created between inlet 30 and outlet 32 which causes a disc 34 in body 28 to move downwardly as FIG. 1 is viewed against the bias of a spring 36. The flow path between the inlet and outlet may be regarded as part of the main or primary air line to the equipment. When the equipment is inactivated, the flow of air between inlet 30 and outlet 32 ceases and disc 34 returns upwardly under the bias of spring 36.

Each time that disc 34 moves downwardly, it opens valving described briefly below to admit a pulse of air under pressure into a secondary or branch air line which includes an outlet port 38 in body 28, an inlet port 40 in the body 42 of pump 22, and certain ports and passageways in counting mechanism 26 described in detail below. If outlet port 28 were connected directly to inlet port 40, pump 22 would be actuated upon each downward movement of disc 34. This mode of operation of sensor 24 and pump 22, as well as their structure, are disclosed in U.S. Pat. Nos. 3,731,763 and 3,926,279, referred to above.

For purposes of this disclosure, suffice it to say that port 40 communicates into a cylinder containing a piston (neither shown), the piston being connected to a plunger 44 which, in retracted position, is disposed to the left as FIG. 1 is viewed of a chamber 46 filled with lubricant from a suitable source through an inlet passageway 48 and port 50. When the plunger is advanced, it injects lubricant from chamber 46 past a check valve 52 and through a delivery port 54 in pump body 42. From there, the lubricant passes through a passageway 56 in counting mechanism 26 into an inlet passageway 58 in sensor body 28 and thence into an internal passageway 60 in an outlet nozzle 62 mounted within sensor outlet 32. The lubricant is conducted to the equipment to be lubricated by a small diameter flexible tube 63 threaded through the main or primary air line.

Figure 9:
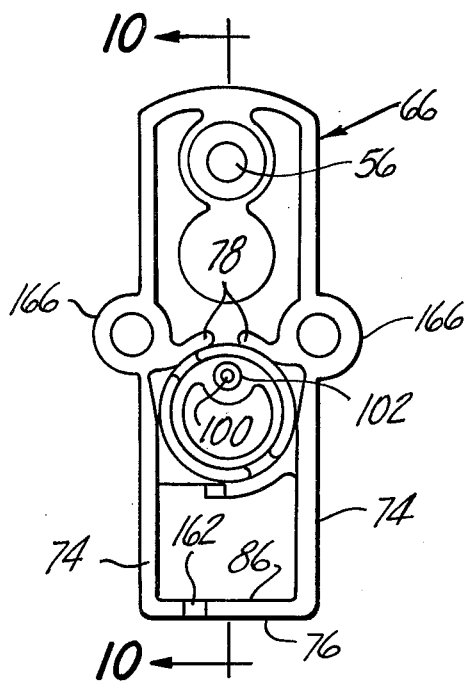
FIG. 9 is a bottom plan view of an outer casing for the valve structure.
Figure 10:
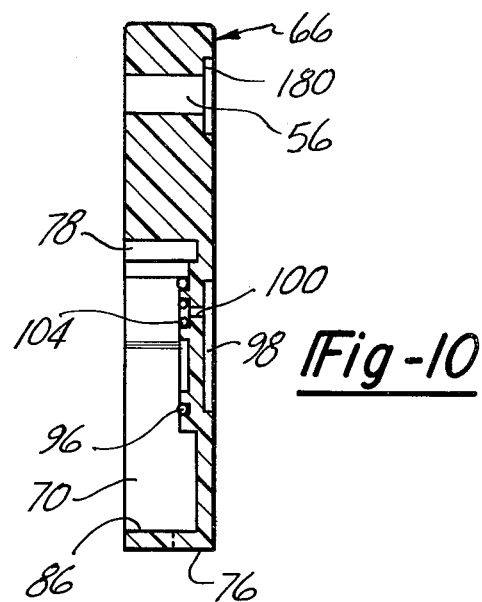
FIG. 10 is a sectional view on line 10—10 of FIG. 9.
Figure 11:
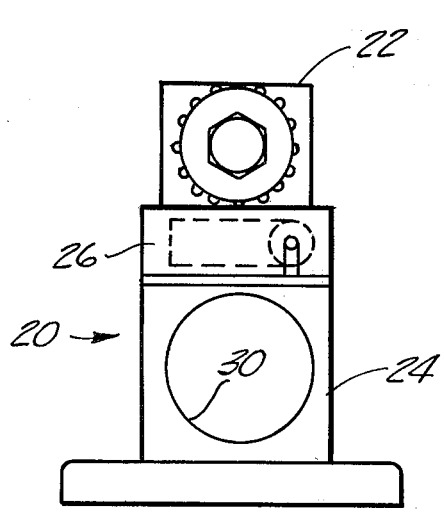
FIG. 11 is a partly diagrammatic end elevational view of the lubricator.

Counting mechanism 26 has a casing 64 which, in the illustrated form of the invention, comprises an outer body 66 and an inner cartridge 68. Body 66 has a hollow portion 70 defined by a top wall 72 (as FIG. 1 is viewed), side walls 74 (FIG. 9), an end wall 76 and a discontinuous arcuately shaped end wall 78. Cartridge 68 has a hollow arcuate portion 80 and a hollow cylindrical portion 82 terminating in an end surface 84. Cartridge 68 fits snugly but removably within hollow 70 with arcuate portion 80 gripped by side walls 74 and end wall portions 78 and with end surface 84 of cylinder 82 engaged against inner surface 86 of end wall 76.

Arcuate wall 80 of cartridge 68 defines an interior cylinder 88 shouldered at 90 and continuing in a radially enlarged portion 92 which terminates at an upper arcuate surface 94. In assembled relation of cartridge 68 and body 66, surface 94 engages an O-ring 96 disposed in an arcuate notch on the underside of top wall 72 of body 66 as shown in FIG. 1. A portion 98 of wall 72 extends athwart and forms an end wall for the cylindrical chamber defined by wall portions 88,92 of cartridge 68. Wall portion 98 has a port 100 with a radial enlargement 102 at its lower end for receiving an O-ring 104. Wall portion 98 also has a central opening 106 for a purpose to be described and is recessed at 108 for receiving an O-ring 110.

A valve member 112 is mounted within chamber 88,92. This valve member has a circular disc portion 114 whose outer periphery seats rotatably on shoulder 90 and fits within radially enlarged portion 92 of the chamber. Wall portion 98 and surface 90 contain valve member 112 within chamber 88,92; and surfaces 90 and 92 cooperate to guide rotary movement of the valve member. Disc 114 has an off-center opening 116 therethrough radially positioned for intermittent registry with port 100 in wall portion 98 of body 66. The underside of disc 114 is provided with a ratchet wheel 118. Valve member 112 has a central blind opening 124 which receives a coil spring 126 and a ball check 128 having a diameter larger than that of opening 106. In a typical counter 26, ball 128 is made of rubber. Opening 124 is substantially on the axis of rotation of valve member 112 and in assembled relation of the parts, spring 126 urges ball 128 upwardly toward a position for closing opening 106.

Figure 2:
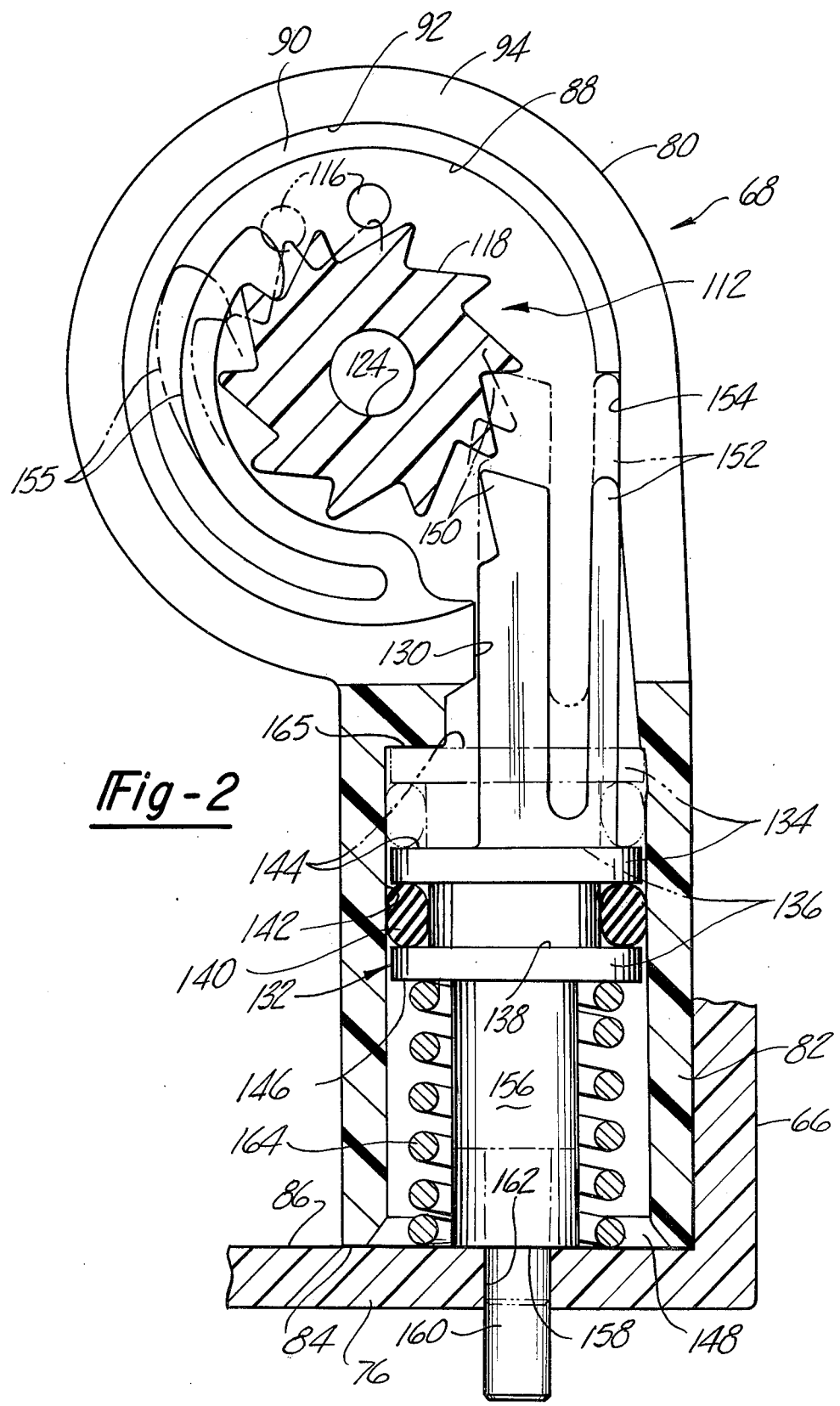
FIG. 2 is an enlarged scale view, partly in plan and partly in section, of a valve sub-assembly according to the invention.

The interior of cylinder 82 communicates pneumatically with chamber 88,92 through an open end 130 (FIG. 2). A piston 132 reciprocable in cylinder 82 has a pair of lands 134,136 spaced axially apart to define a groove 138 within which is received an O-ring 140 which slidably engages the interior surface 142 of cylinder 82. Land 134 has a face 144 exposed to the pressure of air in chamber 88,92 through opening 130 and land 136 has a face 146 exposed to atmosphere through an open end 148 of cylinder 82. An actuating pawl 150 projects axially from land face 144, through opening 130, and into chamber 88,92 for driving engagement with ratchet wheel 118.

Also projecting from face 114 is a leaf spring 152 slidably engaged against a surface portion 154 within chamber 88,92. The relaxed position of spring 152 is illustrated in FIG. 5 which shows piston 132 separately. It will be noted that spring 152 is angled outwardly somewhat with respect to the axis of the piston. When the piston is assembled within cylinder 92, surface 154 bends spring 152 radially inwardly. Thus stressed, spring 152 tilts piston 132 around O-ring 140 counterclockwise as FIG. 2 is viewed, thereby assuring that actuating pawl 150 will engage the teeth on ratchet wheel 118. A flexible retaining pawl 155 projects inwardly from chamber surface 88 and engages the teeth of ratchet wheel 118 to prevent retrograde rotation of valve member 112, clockwise as FIG. 2 is viewed, when pawl 150 is retracted from engagement with ratchet wheel 118 by piston 132.

A piston rod 156 (FIG. 5) projects axially away from land 146, has a radial shoulder 158, and continues in a smaller diameter portion 160 dimensioned to pass through an opening 162 (FIG. 9) in end wall 76 of cartridge body 66 for visual observation. Shoulder 158, by engagement with wall 76, serves as a stop to limit retraction of piston 132. A coil spring 164 surrounds piston rod 156 and is compressed between land surface 146 and inner surface 86 of end wall 76. In the forward position of piston 132 (dotted lines FIG. 2), its face 144 engages a shoulder 165 in cylinder 82 under the urging of spring 164.

Casing body 66 has a pair of apertured mounting ears 166. In assembled relation of the parts, counting mechanism is clamped between pump 22 and sensor 24 by bolts or screws 168 which pass through openings (not shown) in pump body 42, through ears 166, and through or into openings 170 in body 28 of sensor 24. O-ring 110 is seated within recessed portion 98 of upper casing wall 72 and is engaged against the underside of pump body 42 around port 40. An O-ring 172 seats in a groove 174 around outlet 38 in body 28 of sensor 24, this O-ring engaging against the under surface 176 of annular wall 80 of cartridge 68. An O-ring 178 seats in a recessed portion 180 of upper casing wall 72 around passageway 56 and engages against an under surface portion of pump body 42 surrounding lubricant outlet port 54. An O-ring 182 seats in a recessed portion 184 around lubricant inlet port 58 in sensor body 28, this O-ring being engaged against an under surface portion 186 of casing body 66 surrounding lubricant passageway 56.

The valving in sensor 24, referred to above, includes a poppet valve member 188 mounted on a post 190 carried vertically by disc 34 for closing and opening a vent port 192 to atmosphere, and a passageway 194 formed by clearance around post 190 for admitting air under pressure from inlet 30 into chamber 88,92.

In use, it will be assumed that after lubricator 20 has been assembled as described, inlet 30 and outlet 32 in sensor body 28 have been connected into an air line through which compressed air is furnished to a tool. It will also be assumed that port 116 in valve member 112 is out of registry with port 100 so that the top of the valve member in cooperation with O-ring 104 closes port 100. When the equipment to be lubricated is set into operation, sensor disc 34, post 190 and valve member 188 move downwardly to close port 192 and contain the compressed air admitted through passageway 194 and port 38 into the interior of chamber 88,92.

This pulse of pressurized air is communicated into cylinder 82 through opening 130 causing piston 132 to retract from the dotted line position to the solid line position of FIG. 2 against the bias of spring 164. Piston 132 retracts actuating pawl 150 and spring finger 152 from the dotted line position to the solid line position of FIG. 2. During this movement, valve member 112 is secured against retrograde rotation, clockwise as FIG. 2 is viewed, by engagement of retainer pawl 155 with a tooth on ratchet wheel 118 as shown in solid lines in FIG. 2. Since port 100 is closed, this pulse of air under pressure does not reach pump 22 and the pump remains unactuated. The pressure of the air in chamber 88,92 urges valve disc 114 upwardly into tight sealing engagement with O-ring 104.

When the equipment to be lubricated is deactuated, the flow of air from inlet 30 to outlet 32 ceases and sensor disc 34 is returned upwardly by spring 36. This elevates valve member 188 and opens vent port 192, thereby relieving the air pressure in chamber 88,92 and cylinder 82. Spring 164 returns piston 132, actuator pawl 150, and spring finger 152 from the retracted position shown in solid lines in FIG. 2 to the advanced position shown in dotted lines. During this movement, actuator pawl 150 engages a tooth of ratchet wheel 118 and rotates the wheel and valve member 112 a fraction of a revolution counterclockwise as FIG. 2 is viewed, causing port 116 to move through a like distance as represented in solid and dotted lines in FIG. 2.

Also during this movement, retainer pawl 155 is cammed radially outwardly by the leading face of a ratchet tooth and then, through its own resilience, snaps into engagement with the trailing face of that tooth to retain valve member 112 against retrograde movement during the succeeding cycle of operation. In the lubricator illustrated, ratchet wheel 118 has 10 teeth so that valve member 112 is advanced 1/10th of a revolution for each cycle of operation of piston 132, and port 116 registers with port 100 once for each ten cycles of operation of the piston. During movement of the valve member, the top of disc 114 slides against O-ring 104, but this occurs when chamber 88,92 is depressurized so that friction between the two is not significant.

The lubricator continues to cycle in the manner described above until ultimately, port 116 is moved into registry with port 100 by a return movement of piston 132 and actuating pawl 150. This occurs when chamber 88,92 is depressurized so that pump 22 remains unactuated. Then, in the succeeding cycle of operation, when chamber 88,92 is pressurized, not only does piston 132 retract but the pressure is transmitted into pump 22 through aligned ports 116 and 100. Plunger 44 is advanced to deliver a predetermined quantity of lubricant through the delivery system described above, and to the equipment to be lubricated. When chamber 88,92 is subsequently depressurized, piston 132 and actuating pawl 150 are again advanced by spring 164 to move port 116 out of registry with port 100, thereby again closing port 100 for the next nine cycles of operation. From the above described mode of operation, it will be seen that chamber 88,92 and ports 100,116 comprise portions of the branch air line through which air is conducted to pump 22.

The effective area of piston 132 exposed to the pressure of air in chamber 88, 92 is considerably smaller than the effective area of the piston (not shown) which advances pump plunger 44. In a typical lubricator 20, piston 132 has a diameter of about ⅜ inch while the diameter of the pump piston is about ⅝ inch. Thus, the ratio of these diameters is about 3 to 5 and the ratio of the effective areas of the pistons is about 9 to 25. When port 192 is opened to vent chamber 88,92 to atmosphere, the return spring for the pump piston must work against nearly three times the force as return spring 164 for piston 132. These two springs are very similar to one another and, in fact, are preferably identical where possible for purposes of economy of manufacture. The result is that spring 164, working against the lesser force, returns piston 132 much more quickly than the pump piston, working against the greater force, can return plunger 144. Port 116 is moved so quickly out of registry with port 100 that valve member 112 traps air under pressure in the pump cylinder, causing plunger 44 to remain in its advanced position.

Strictly from the standpoint of functioning of the lubricator, this would make no difference because the air trapped in the pump would be exhausted the next time that port 116 aligned with port 100 and plunger 44 would then retract. However, the pump piston has a rod 200 which projects to the exterior of pump body 42 for visual observation and an observer of the lubricator, upon seeing that rod 200 has remained in its advanced position, might conclude that the lubricator is not functioning properly and, in addition, he could not manually operate the pump by depressing rod 200 if, for any reason, he should desire to do so. Ball check 128 is provided for venting the trapped air from the interior of the pump.

Ball 128 is moved downwardly against the bias of spring 126 by the pressure of the trapped air, thereby opening port 106 and permitting the air to escape through port 116 and around the edges of valve disc 114. The return spring in the pump is then able to retract the pump piston plunger 44 and piston rod 200. After the air has escaped from the pump cylinder, spring 126 returns ball 128 upwardly to close port 106 for containing the pulses of air under pressure in chamber 88,92 in subsequent cycles of operation.

In a typical pump 22, plunger 44 has a diameter of about 0.125 inch and the length of its lubricant injection stroke can be adjusted so that each time the plunger advances, it delivers from about one drop to about 1/10th drop of lubricant. The adjusting mechanism is conventional and includes a manually turnable knob 202 at the exterior of pump body 42. In cooperation with counting mechanism 26, this pump delivers lubricant at the rate of about one drop to about 1/10th drop for every ten cycles of operation of the equipment to be lubricated, i.e., at an overall effective rate of about 1/10th drop to about 1/100th drop per cycle of operation of the equipment. This rate could be increased simply by adding more ports 116 in valve disc 114. The delivery rate could also be varied by modifying valve member 112 to provide a different number of teeth on ratchet wheel 118.

In the interests of simplicity of manufacture and low cost, all parts of counting mechanism 26 with the exception of the various O-rings, ball 128, and springs 126, 164 are made of an inexpensive molded plastic material such as acetal. Arcuate wall 80, cylinder 82, and retainer pawl 155 are preferably integrally molded and the same is true of piston 132, actuating pawl 150, and spring finger 152, as well as valve disc 114 and ratchet wheel 118. The overall dimensions of a typical counting mechanism 26 are about 3½ inches long, 1¾ inches wide, including ears 166, and ⅝ inch high. A typical counting mechanism 26 costs about fifty cents to make.

Figure 12:
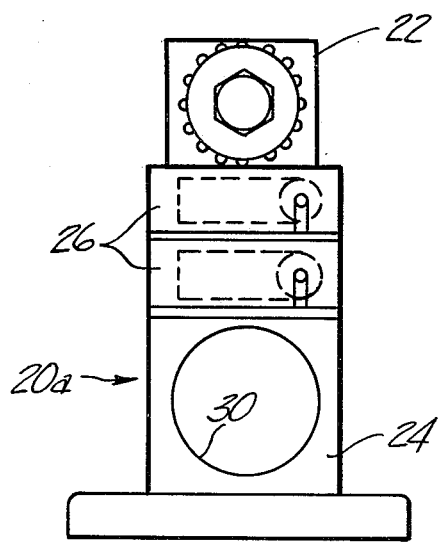
FIG. 12 is a partly diagrammatic end elevational view of a modified form of lubricator.

The form of the invention shown in FIG. 12 is similar to that described above, except that two counting mechanisms 26 are interposed between valve 22 and sensor 24. With this arrangement, port 100 in lower counting mechanism 26 opens into chamber 88,92 of the upper counting mechanism and its port 100 is, in turn, in communication with port 40 in pump body 42. Upper valve member 112 is rotated 1/10th of a revolution each time that lower port 100 is opened and air will be furnished to pump 22 once for each 100 cycles of operation of the equipment to be lubricated. Thus, by stacking two or more containers 26, by changing the numbers of ports 116 in their valve discs 114, and by changing the number of teeth in their ratchet wheels 118, a wide range of delivery rates can be obtained.

While the invention is disclosed with reference to a sensing device 24, the invention is not so limited in scope. For one example, sensor body 28 could be replaced by a simple solid mounting block through which port 38 and lubricant delivery passageway 58 extend for connection respectively to the primary air line for a tool to be lubricated and a lubricant delivery means extending to the tool. As another example, port 38 might comprise simply the end of a pipe tube or other duct extending to the primary air line and connected to the underside 176 of chamber 88,92; and lubricant delivery passageway 58 might comprise a pipe, tube or other duct connected directly to the underside 186 of body 66 for receiving lubricant from passageway 56.

We claim:

1. In a lubricator adapted to be mounted in a primary air line through which air under pressure is furnished to pneumatically operated equipment to be lubricated, and having a pump having a connection with said primary air line formed by means including a branch air line through which pulses of air under pressure are transmitted to said pump for operating the same, said pump being effective upon operation to emit a predetermined quantity of lubricant for lubricating such equipment, improved structure comprising:
   a casing having an outlet communicating with said pump and defining at least in part a chamber communicating with said branch air line upstream of said pump,
   a movable valve member mounted in said chamber, said valve member being rotatably movable in said casing and having an opening positioned to register with said outlet for opening said branch air line,
   operating means operable responsive to successive pulses of air in said chamber to move said valve member incrementally, said valve member being operable to open said branch air line after a predetermined number of incremental movements thereof, and to close said branch air line during intervening incremental movements thereof, whereby to operate said pump only once for each series of such successive pulses of a predetermined number.

2. The structure defined in claim 1 wherein said valve member is substantially circular and said opening extends from one axial side to the other axial side thereof, said casing having a substantially cylindrical wall portion which guides movements of said valve member.

3. The structure defined in claim 2 wherein said chamber has an end wall athwart said wall portion through which said outlet extends.

4. The structure defined in claim 3 and including seal means around said outlet engaged by said valve member to contain air under pressure in said chamber when said branch air line is closed by said valve member.

5. The structure defined in claim 4 wherein said seal means comprises an O-ring mounted on said end wall and slidably engaged by said valve member.

6. The structure defined in claim 1 and including said casing having a body with a cavity therein, said cavity having side wall portions which adjoin an end wall, and a cartridge having a portion fitted within said side wall portions of said casing and having a hollow interior which cooperates with said end wall to form said chamber at least in part.

7. The structure defined in claim 6 wherein said end wall has an outlet which communicates with said pump and which is opened and closed by said valve member for opening and closing said branch air line.

8. The structure defined in claim 6 wherein said cartridge includes another portion within said body having an interior which communicates into said chamber, said operating means including one element movable in said other portion responsive to air pulses in said chamber, said operating means also including another element connected with said one element and projecting into said chamber for moving said valve member.

9. The structure defined in claim 8 wherein said interior of said other portion comprises a cylinder and said one element comprises a piston, said piston having a region exposed to the pressure of air in said chamber and another region exposed to atmosphere, seal means between said cylinder and the portion of said piston between said regions, and spring means stressed between said other region and another wall portion of said body for urging said piston toward said chamber.

10. The structure defined in claim 9 wherein other region includes a diametrically extending face and a piston rod projecting therefrom, said spring means comprising a coil spring around said rod compressed between said face and said other wall portion.

11. The structure defined in claim 10 wherein said other wall portion has an opening therein and said rod has an end portion which projects through said opening to the exterior of the said body.

12. The structure defined in claim 1 and including in addition pressure relief means operable to relieve the pressure of air trapped in said pump incidental to closing of said branch air line.

13. The structure defined in claim 12 wherein said pressure relief means comprises a check valve.

14. The structure defined in claim 13 wherein said chamber has a wall with one port therein forming a portion of said branch air line which is opened and closed by said valve member, said wall having another port which is opened and closed by said check valve.

15. The structure defined in claim 14 wherein said check valve is carried by said valve member.

16. The structure defined in claim 15 wherein said valve member is rotatable in said chamber, said other port being located substantially on the axis of rotation of said valve member.

17. The structure defined in claim 16 wherein said check valve comprises a ball check and a spring stressed to urge said ball check in a direction for closing said other port.

18. The structure defined in claim 17 wherein said valve member has a central recess within which said ball check and spring are received.

19. The structure defined in claim 1 wherein said casing includes a portion defining a cylinder which communicates into said chamber, said operating means including a piston movable in said cylinder responsive to successive pulses of air in said cylinder.

20. The structure defined in claim 19 wherein said piston is movable against the bias of spring means operable to return-move said piston upon relief of pressure in said chamber.

21. The structure defined in claim 20 wherein said operating means is operable to move said valve member upon return movement of said piston.

22. The structure defined in claim 21 wherein said operating means includes a pawl movable with said piston and being cooperable with a ratchet having a driving connection with said valve member.

23. The structure defined in claim 22 and including other spring means in said casing biased to urge said pawl laterally toward driving engagement with said ratchet.

24. The structure defined in claim 23 wherein said other spring means comprises a finger projecting axially of said piston, said finger being slidably engaged with and reacting against an interior surface portion of said casing.

25. The structure defined in claim 24 wherein an O-ring seal is carried by said piston in engagement with said cylinder, said finger being effective to tilt said piston laterally around said O-ring for urging said pawl toward said ratchet.

26. The structure defined in claim 24 wherein said piston, pawl, and finger are integrally formed and said valve member and ratchet are integrally formed.

27. The structure defined in claim 26 and including a retaining pawl in said chamber cooperable with said ratchet to retain said valve member against retrograde movement, said retaining pawl and a portion of said casing being integrally formed.

28. In a lubricator constructed and arranged to be mounted in a primary air line through which air under pressure is furnished to pneumatically operated equipment to be lubricated and having a pump communicating with said primary air line so that pulses of air under pressure in such primary air line are transmitted to said pump for operating said pump to emit a predetermined quantity of lubricant for lubricating such equipment, the improvement comprising: a movable valve member controlling the flow of air under pressure to said pump operating the same and constructed and arranged to open on an incremental movement thereof and to remain closed during a plurality of incremental movement thereof, and a pneumatically actuated operating mechanism communicating with said primary air line and constructed and arranged to incrementally move said valve in response to successive pulses of air in said primary air line such that said pump operates only once for each series of a predetermined number of such successive pulses of air.

29. The lubricator of claim 28 which also comprises a body having a hollow portion constructed and arranged to receive a cartridge, and a cartridge received in said body, and said operating mechanism comprises a hollow cylinder in said cartridge, a piston reciprocable in said cylinder, an actuator connected to said piston, and a ratchet operably connected with said valve and constructed and arranged to be moved incrementally by said actuator.

30. The lubricator of claim 29 wherein said valve is received in said body.

* * * * *